July 17, 1951
L. J. HANSEN
2,560,723
FISH LURE RETRIEVING DEVICE
Filed Dec. 16, 1946
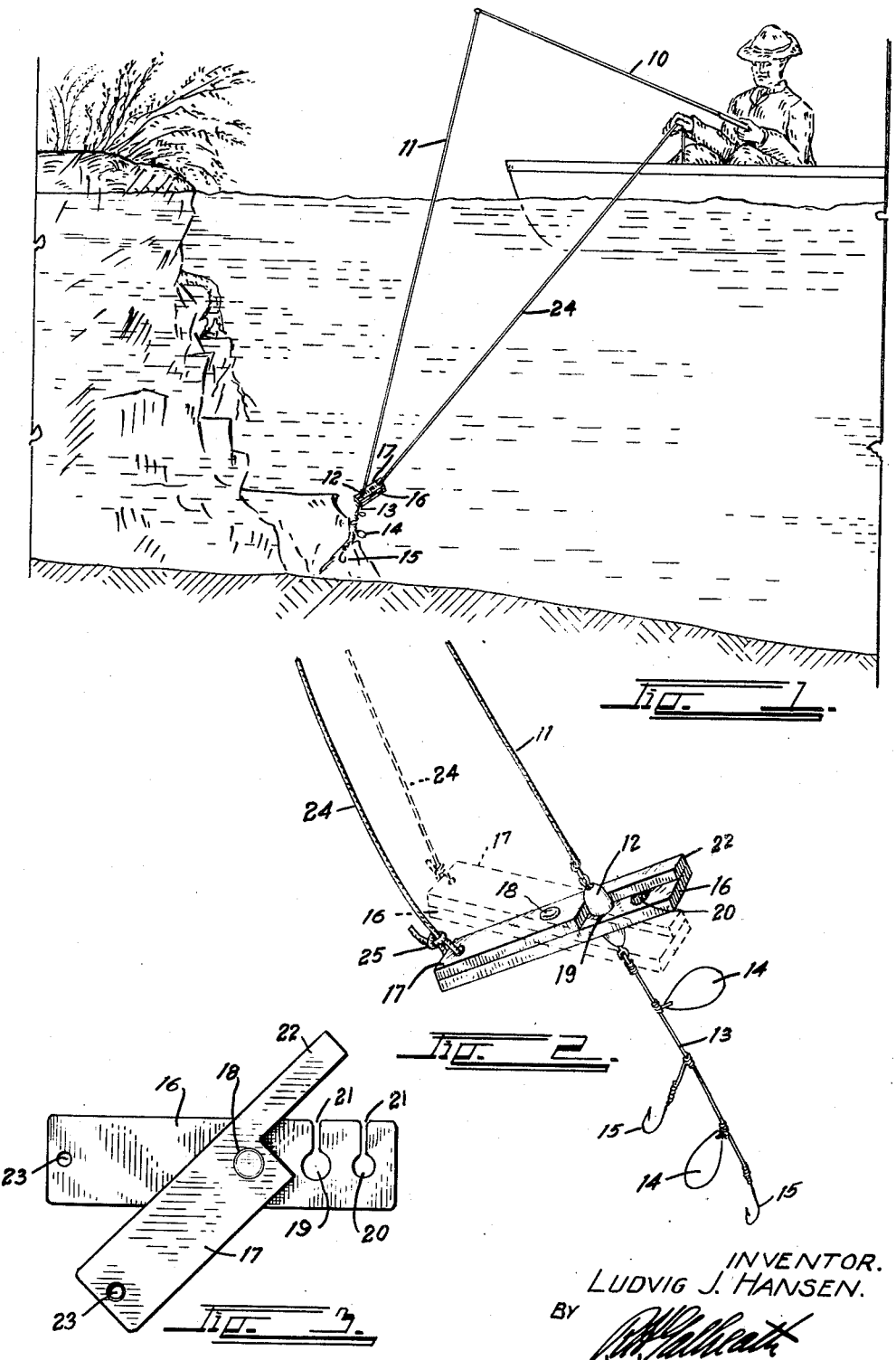
INVENTOR.
LUDVIG J. HANSEN.
BY
ATTORNEY.

Patented July 17, 1951

2,560,723

UNITED STATES PATENT OFFICE 2,560,723

FISH LURE RETRIEVING DEVICE

Ludvig J. Hansen, Denver, Colo.

Application December 16, 1946, Serial No. 716,497

1 Claim. (Cl. 43—17.2)

This invention relates to a fish lure retrieving device, and applies more particularly to the use of lures in "trolling." It often happens that a string of lures and hooks being trolled through a body of water will become entangled with underbrush or other obstructions on the bottom of said body of water. If it is attempted to pull the entangled lures loose, the line may be broken, resulting in the total loss of both the line and the lures.

For this type of fishing, the lures and hooks are usually mounted along a wire leader extending from a suitable swivel on the extremity of the line. Naturally, any attempt to pull the lures loose will result in breaking the line before it breaks the wire leader.

The principal object of this invention is to provide a retrieving device which may be quickly and easily applied to the "stuck" line, and which can be lowered along the line to the lower extremity thereof to engage a swivel at the upper extremity of a wire leader so that a sufficient pull may be applied directly to the swivel and leader to break the engaged hooks loose from the obstruction without breaking the line and without losing the valuable lures thereon.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 illustrates the improved fish lure retrieving device in use;

Fig. 2 is a perspective view thereof, illustrating it applied to a fish line; and Fig. 3 is a plan view of the improved retrieving device in the open position.

In the drawing, conventional fishing tackle is indicated and designated by numeral as follows: rod 10, line 11, line swivel 12, leader 13, lures 14, and hooks 15. The improved retrieving device comprises two parts, an elongated clamping plate 16 and a line-locking plate 17, pivoted together intermediate their extremities by a suitable pivot rivet 18 so that they may be rotated one with respect to the other in parallel planes and be swung out of alignment with each other at their extremities, as shown in Fig. 3.

The plate 16 is provided with two clamping holes 19 and 20, from each of which a line slot 21 extends transversely to one edge of the plate. The holes 19 and 20 are of different sizes so as to approximately fit the larger and smaller swivels 12 usually found upon the market.

The plate 17 is formed with a projecting rectangular finger portion 22 extending longitudinally therefrom and integral therewith, said finger portion being of a width which is less than the width of the plates and located to one side of the longitudinal center of said plates, which, when the plates are swung to a parallel position, extends across and closes the line slots 21.

Each plate is provided with a draw string opening 23 at the extremity opposite from the holes 19 and 20 and finger 22. When the two plates are swung into alignment, as shown in Fig. 2, these holes 23 align with each other for the reception of a draw string 24, which is knotted therethrough as shown at 25.

Let us assume that one of the hooks 15 has become entangled with underbrush or with the lake bottom, as shown in Fig. 1, so that the line 11 cannot be withdrawn. The fisherman slips the plate 16 about the line 11 by passing the line through the line slot 21 of the desired clamping hole 19 or 20, depending upon the size of the swivel being used.

He then swings the two plates into alignment to lock the line in one of the holes 19 or 20, and ties the draw string 24 through the openings 23 and allows the device to descend along the line 11 by gravity. In clear water he can note when the device passes onto the swivel 12. In obscured water he can determine this position by the feel of the line 11 and the draw string 24.

When the device is upon the swivel 12, the draw string 24 is pulled toward the fisherman. This causes the two plates to exert a twisting and clamping action on the swivel, the line 11 being maintained taut. The fisherman can then apply sufficient pull upon the draw string 24 to break the hook 15 from its entanglement, and if this is not possible, he can then exert sufficient pull to completely break the hook.

Since the pull is applied to the wire leader 13 through the draw string 24, there is no damage to the line 11 and no loss of the lures 14. The only damage which can result is the destruction of one or more of the comparatively inexpensive fish hooks 15.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:

A device for retrieving a fish lure including a swivel comprising a pair of rectangular plates pivotally connected together intermediate their ends in such manner as to rotate one with respect to the other in substantially parallel planes, both of said plates having a draw string receiving opening therein adjacent one end thereof, one of said plates having a second opening therein adjacent its other end, said second opening being of such size and shape as to freely receive the swivel of the lure, there being a slot extending transversely from a side edge of the latter plate and communicating with the second opening and constituting an entrance through which a fish line may be passed into the said second opening, the other plate having a rectangular finger extending longitudinally therefrom and integral therewith, said finger being of a width which is less than the width of the said plates and located to one side of the longitudinal center of said other plate in such a position as to cover the entrance slot and retain a fish line in the said second opening when the plates are turned about their pivotal connection to a position in which the side edges of the plates are in parallel alignment with each other.

LUDVIG J. HANSEN.

REFERENCES CITED

The following references are of record in the file of this patent:

UNITED STATES PATENTS

| Number | Name | Date |
| --- | --- | --- |
| 504,203 | De Bem | Aug. 29, 1893 |
| 1,215,073 | Stevens | Feb. 6, 1917 |
| 1,283,876 | Oliver | Nov. 5, 1918 |
| 2,181,317 | Fernstrom | Nov. 28, 1939 |
| 2,390,584 | Hardin | Dec. 11, 1945 |